Feb. 15, 1966  J. T. WATTERS  3,235,099
AIR FILM MATERIAL HANDLING SYSTEM
Filed Nov. 1, 1963  6 Sheets-Sheet 2

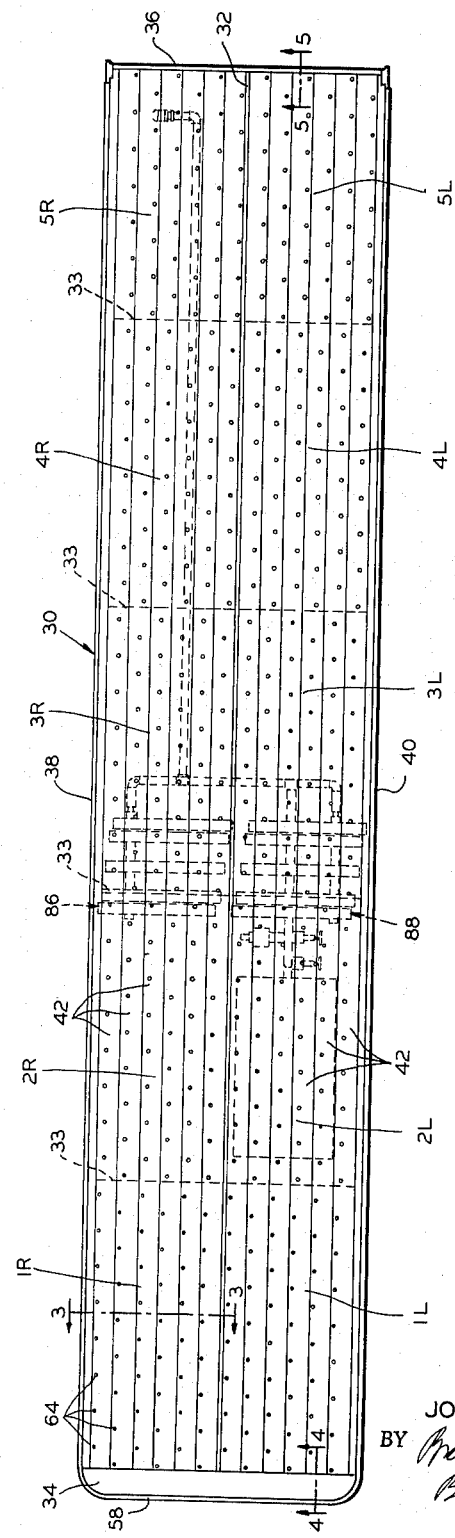

INVENTOR
JOHNNY T. WATTERS
BY
ATTORNEYS

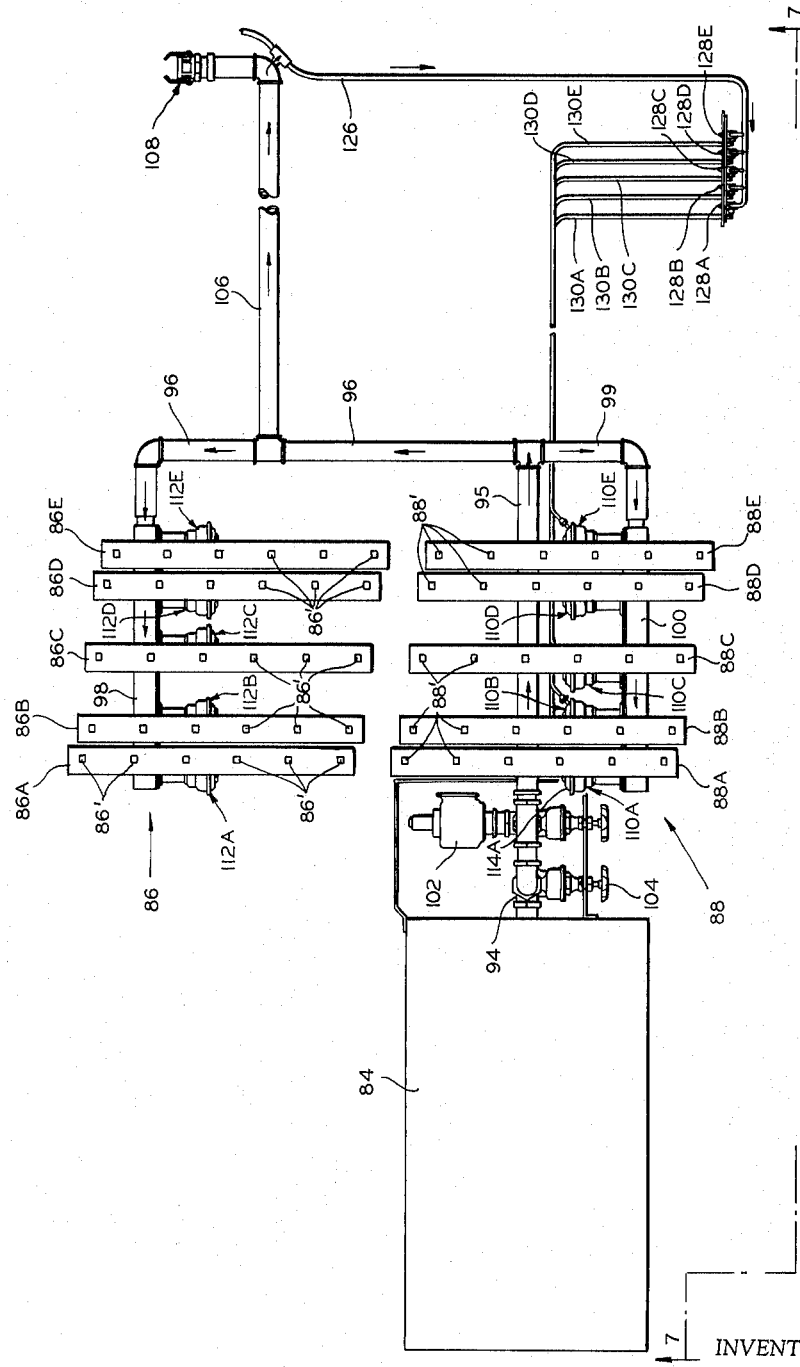

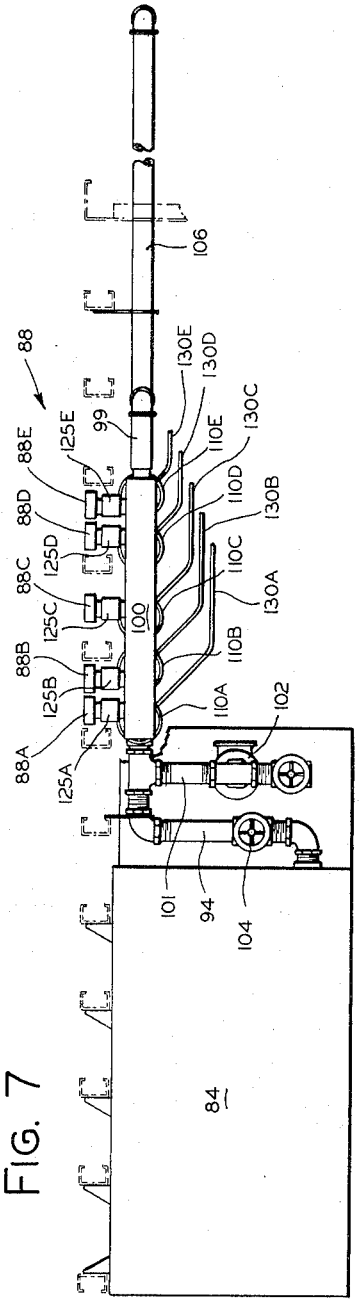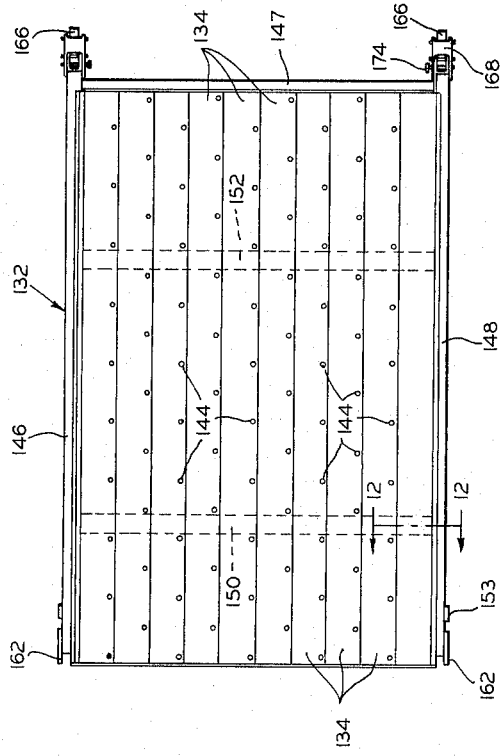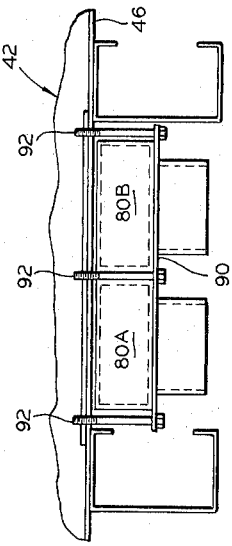

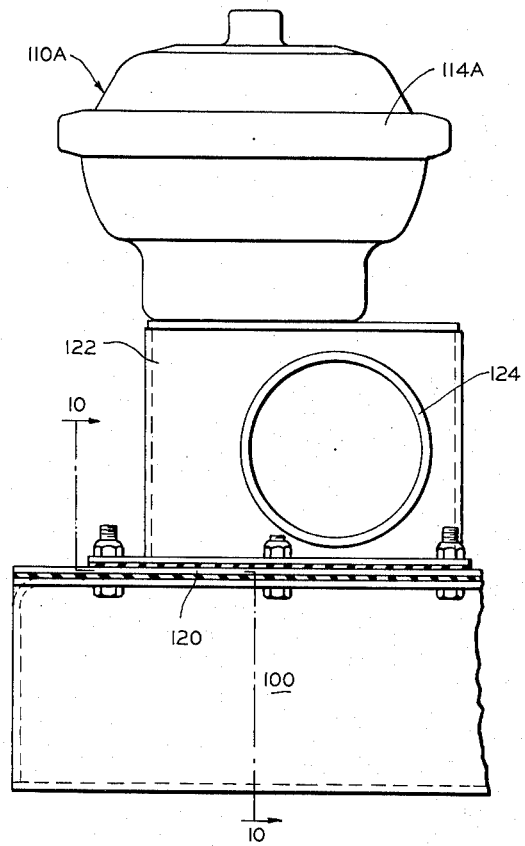
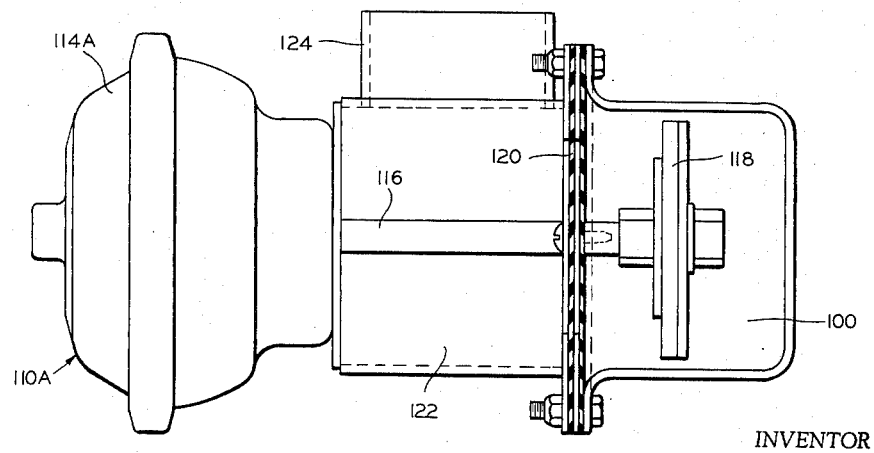

Feb. 15, 1966  J. T. WATTERS  3,235,099
AIR FILM MATERIAL HANDLING SYSTEM
Filed Nov. 1, 1963  6 Sheets-Sheet 6
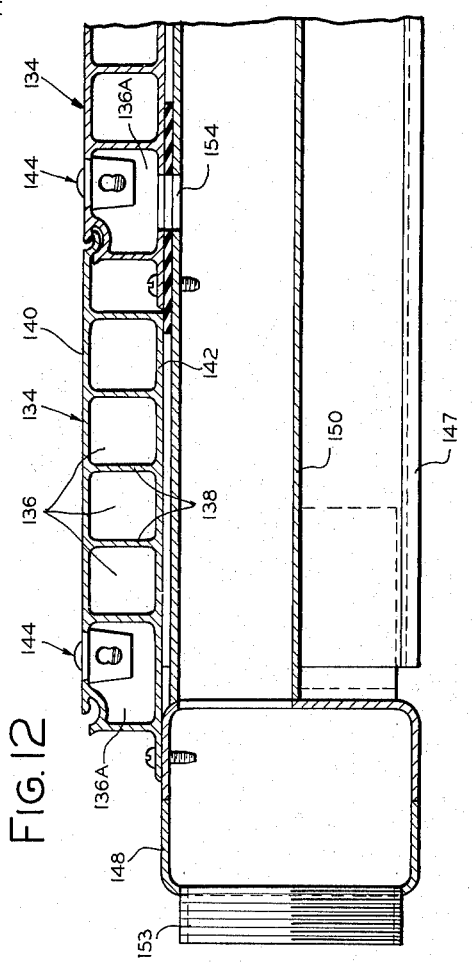
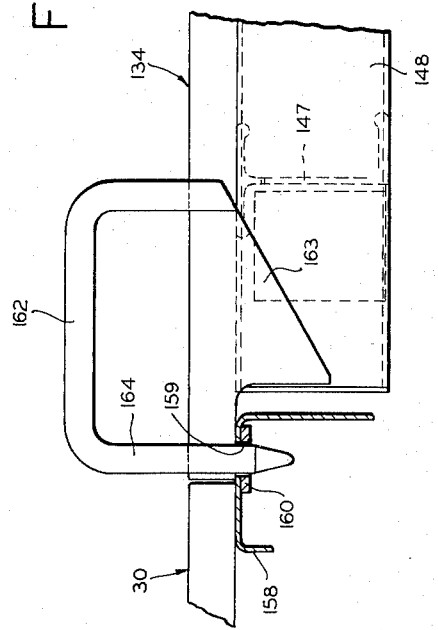
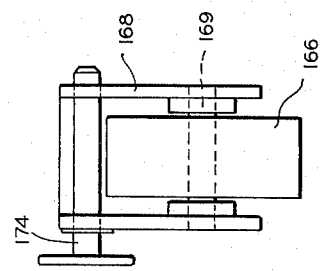
INVENTOR
JOHNNY T. WATTERS
BY
ATTORNEYS

United States Patent Office 3,235,099
Patented Feb. 15, 1966

3,235,099
AIR FILM MATERIAL HANDLING SYSTEM
Johnny T. Watters, Michigan City, Ind., assignor to Clark Equipment Company, a corporation of Michigan
Filed Nov. 1, 1963, Ser. No. 320,884
20 Claims. (Cl. 214—1)

The present invention relates to a material handling system wherein air under pressure is provided in a series of ducts and check valves in a floor so that a loaded pallet or the like positioned on the floor will actuate the check valves and effect release of pressurized air thereby causing a thin film of air to be formed between the pallet and the floor to greatly reduce the coefficient of friction therebetween with the result that a heavy load may be transported across the floor with a minimum of effort.

More specifically, the present invention relates to an improved air-in-floor system whereby various sections of a floor may be selectively energized as required for use without energizing the entire floor system so as to permit the use of an air source of substantially reduced capacity.

While it is known to provide an air-in-floor system to facilitate material handling operations, one of the principal problems encountered heretofore has been in providing a source of air under pressure of sufficient capacity to energize the system, while still providing a system with the desired floor area. This problem is particularly acute where it is desired to incorporate an air-in-floor system in transportation equipment such as a trailer or a railroad car or the like where it is necessary or at least highly desirable to provide an air source which can be mounted on and carried with the vehicle.

Accordingly, it is an object of the present invention to provide an air-in-floor material handling system which permits selective energization of certain segments or portions of a floor which are to be used immediately, without energizing the entire air-in-floor system.

A further object of the invention is to provide an air-in-floor system which is particularly adapted for installation in trailers and other vehicles and which can be used in conjunction with a blower unit or other air source of a capacity which is sufficiently small that it is practical to mount the air source directly on the vehicle so as to be carried therewith.

Another object of the invention is to provide a system of the foregoing type comprised of novel floor plank means wherein the planks themselves are provided with air ducts for conducting air under pressure to one or more selected sections of the floor.

A still further object of the invention is to provide a ball valve assembly which can be installed into the floor of an air-in-floor system from the top surface of the floor by simply snapping the valve assembly into position in a suitable opening provided in the floor for such purpose, and which can be removed therefrom with substantially equal facility.

An additional one of my objects is to provide a dock board which is supplied with air under pressure and which may be used in conjunction with a trailer or other like vehicle for lading and unloading the same.

Now in order to acquaint those skilled in the art with the manner of utilizing and practicing my invention, I shall describe, in conjunction with the accompanying drawings, certain preferred embodiments of my invention.

In the drawings:

FIGURE 1 is a top plan view of a trailer floor constructed in accordance with the present invention and having a plurality of floor sections any one or more of which can be selectively energized for moving loads over the selected sections;

FIGURE 6 is a top plan view of a blower and manifold system for supplying air under pressure to the air ducts formed in the floor plank members of FIGURE 1, the view being taken on a larger scale than FIGURE 1 for purposes of illustration;

FIGURE 7 is a side elevational view looking in the direction of the arrows 7—7 of FIGURE 6;

FIGURE 8 is an enlarged fragmentary side elevational view showing the manner in which a plurality of floor manifolds arranged transversely relative to the longitudinal air ducts in the floor plank members are secured to the underside of the floor members to supply air under pressure thereto;

FIGURE 9 is an enlarged fragmentary top plan view showing a portion of a valve chamber and one of a plurality of low pressure air valves which control the flow of air under pressure from the valve chamber to corresponding ones of the floor manifolds of FIGURE 6;

FIGURE 10 is a view, partly in section and partly in elevation, taken substantially along the line 10—10 of FIGURE 9;

FIGURE 11 is a top plan view of an air-in-floor dock board for use in conjunction with the air-in-floor trailer of the present invention and adapted to be supported at one end on the rear edge of the trailer when loading and unloading the latter;

FIGURE 12 is a substantially enlarged fragmentary sectional view taken along the line 12—12 of FIGURE 11 showing the manner of supplying air under pressure to air valves installed in the floor of the dock board;

FIGURE 13 is a broken side elevational view taken on an enlarged scale showing the dock board of FIGURE 12; and FIGURE 14 is an end elevation looking substantially in the direction of the arrows 14—14 of FIGURE 13.

Figure 3:
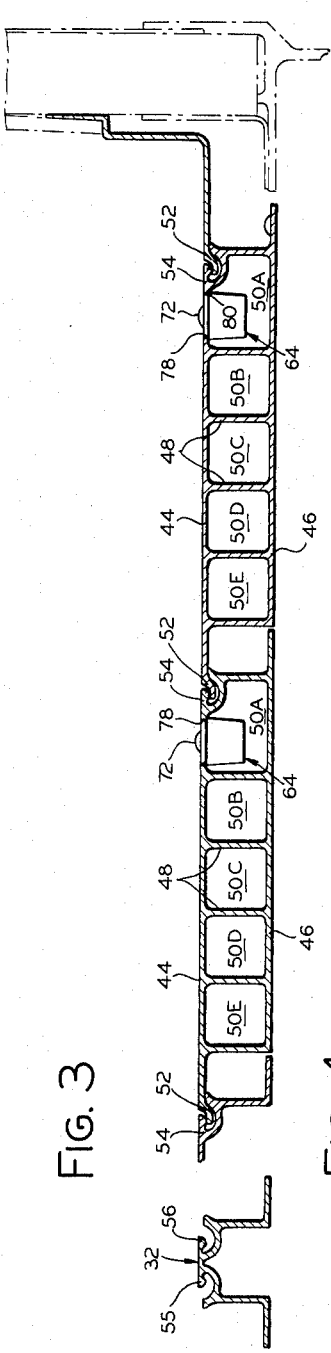
FIGURE 3 is a fragmentary sectional view taken along the line 3—3 of FIGURE 1, the view being broken and taken on a substantially enlarged scale to more clearly illustrate the configuration of the plurality of plank members which comprise the trailer floor of FIGURE 1 and particularly the plurality of air ducts formed in each of the plank members.

Before describing my invention in detail, it should be understood that the improved air-in-floor system of the present invention has utility in any application of an air-in-floor system where it is desired to permit selective energization of a portion of the floor without the necessity of energizing the entire floor. The invention offers particular advantages with respect to movable equipment such as trailers and railroad cars and other vehicles where it is desired to mount an air source directly on the vehicle, but it also has applicability in warehouses and other stationary installations. Thus, while I will describe hereinbelow a preferred embodiment of my invention showing the application thereof to a trailer floor, it will be understood that the invention is suited to numerous other applications.

Referring now to the drawings, FIGURE 1 is a top plan view of a trailer floor indicated generally at 30 and comprising in effect ten different segments, five segments on the right side of the floor being indicated as 1R, 2R, 3R, 4R and 5R, and five segments on the left side being indicated as 1L, 2L, 3L, 4L and 5L. A narrow longitudinal center strip 32 divides the left and right hand sides of the trailer floor, and a plurality of transverse dotted lines 33 are shown as a convenient means for illustrating the separation of each side of the trailer floor into five longitudinal segments. It should be understood however that the transverse lines 33 are for purposes of illustration only and do not represent structural components of any kind. The structural means for actually dividing the floor into segments for selective energization will be described hereinafter.

In the embodiment shown, the trailer floor 30 is framed by a wooden cross plank 34 at the forward end, a rear end plate 36, and a pair of longitudinal side plates 38 and 40. The floor 30 is itself comprised of a plurality of floor planks 42, twelve planks being provided in the embodiment shown, which extend the full length of the floor and are arranged side-by-side in an interlocking relationship. As best shown in FIGURE 3, each plank 42 comprises a top wall 44, a bottom wall 46, and several vertical divider walls 48 which define a plurality of longitudinal ducts or channels 50 formed within each floor plank 42.

In the preesnt embodiment there are five longitudinal air ducts formed in each plank member 42, and they are identified as 50A, 50B, 50C, 50D and 50E. Each of the plurality of ducts 50 in each plank extends the full length of the plank and thus substantially the full length of the trailer floor. However, as will be brought out more fully hereinafter, in actual operation each of the ducts 50 in a single floor plank member 42 communicates with a different corresponding section of the floor 30 to conduct air thereto, and since in this instance it is desired that there be five longitudinal segments on each side of the floor, there are five corresponding ducts 50 in each of the floor planks.

The floor plank 42 may be constructed in various ways and from numerous suitable materials, the essential feature being that each has formed therein a plurality of longitudinal ducts 50. However, it is preferred that the floor planks comprise hollow aluminum extrusions wherein the upper and lower wall portions 44 and 46 are approximately parallel, and the vertical divider walls 48 are integral with the upper and lower wall portions and approximately perpendicular thereto. Each of the planks 42 is provided with one longitudinal side edge comprising a male interlocking member 52 and an opposite side edge comprising a female interlocking member 54, and the longitudinal center strip member 32 is provided with a pair of female interlocking longitudinal edge portions 55 and 56. The plank members 42 are thus assembled in closely adjacent side-by-side relation as shown in FIGURE 3.

Figure 4:
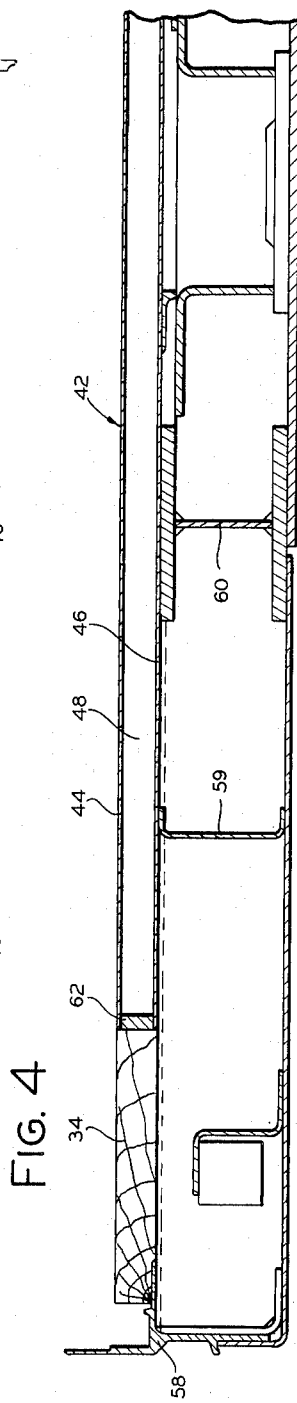
FIGURE 4 is an enlarged fragmentary sectional view taken substantially along the line 4—4 of FIGURE 1.
Figure 5:
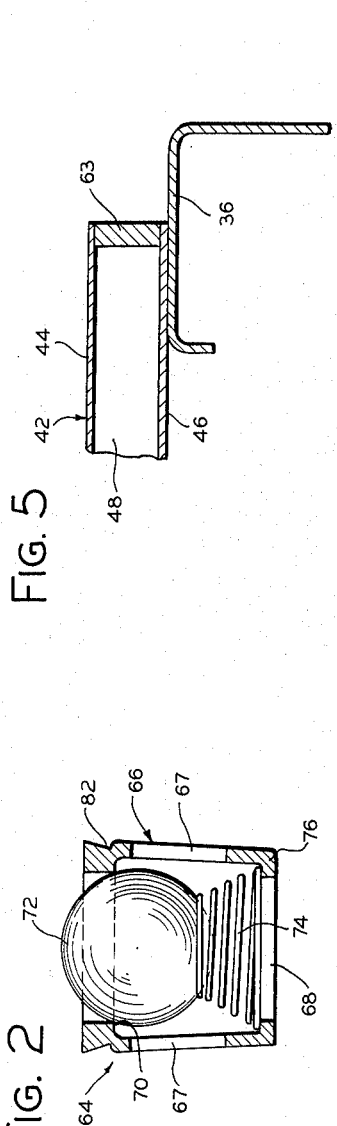
FIGURE 5 is an enlarged fragmentary sectional view taken substantially along the line 5—5 of FIGURE 1.

FIGURE 4 shows a forward end plate 58 and a plurality of supporting beams 59 and 60 upon which the floor is laid, and there is also shown a transverse plug member 62 for closing the forward ends of the several air ducts 50. FIGURE 5 shows the rear end plate 36 and a plug member 63 for closing the rear ends of the several ducts 50. The air ducts 50 thus extend unimpeded between the forward floor plug 62 and the rear floor plug 63, and as will be brought out more fully hereinafter, they are provided with air inlet openings in the bottom walls 46 and air outlet openings formed in the top walls 44 of the floor plank members 42, the outlet openings each having a ball valve installed therein.

Figure 2:
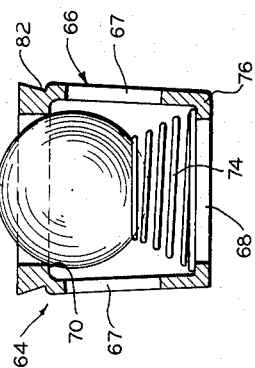
FIGURE 2 is an enlarged vertical section of a ball valve assembly suitable for installation in the floor system of FIGURE 1.

FIGURE 2 shows a ball valve 64 of a type which is installed in the top wall 44 of the floor planks 42 for the purpose of emitting air under pressure when actuated by a loaded pallet or the like positioned on the floor surface. The valve 64 comprises a plastic housing 66 which is generally tubular in its configuration and is formed with apertures 67 in the side walls thereof and an aperture 68 in its bottom portion so that the housing is radially compressible for insertion into an opening adapted to hold the same. The upper end of the valve housing 66 is formed with an internal annular ledge or shoulder 70 which serves as a sealing surface or seat. A steel ball 72 is disposed within the valve housing 66 and is urged upwardly against the seat 70 by a compression spring 74, one end of the spring being engaged against the underside of the ball and the other end being supported on an annular internal ledge 76 formed integral with the lower end of the valve housing.

Each of the plank members 42 is provided with a plurality of countersunk holes 78 (see FIGURE 3) in which the ball valves 64 are mounted. Thus, the holes 78 are formed in the top walls 44 of the floor planks so as to communicate with a corresponding air duct 50, and a ball valve 64 is installed by simply pressing the housing 66 downwardly until it snaps into position as shown in FIGURE 3. As stated hereinabove, the housing 66 is radially compressible to permit installation in the foregoing manner, and when the housing is pressed downwardly into a locked position, a radially inwardly projecting annular edge portion 80 of the wall 44 formed at the lower end of the countersunk hole 78 will be seated in a reduced diameter peripheral neck portion or groove 82 (see FIGURE 2) formed adjacent the upper end of the valve housing 66 so as to lock the latter in place.

When a valve assembly 64 is properly installed in one of the floor planks 42, the valve housing 66 will project downwardly into the corresponding air duct 50 in spaced relation to the side walls 48 and bottom wall 46 of the duct as shown in FIGURE 3, and the ball 72 will project above the top surface of the upper floor wall 44 so as to be adapted to be depressed by a loaded pallet positioned over the corresponding floor section thereby to release air under pressure which air will form a thin film between the bottom of the pallet and the floor surface thus lifting the pallet a very slight distance off of the floor. It will now be understood that the ball valves 64 may be readily installed in the floor planks 42 at predetermined locations where suitable holes 78 have been provided, by simply pressing the valve housing downwardly to snap it into locked position. In addition, the ball valves 64 may be removed from the top side of the floor surface by simply depressing the ball 72, gripping the valve housing 66 with a suitable hook or the like, and pulling the housing upwardly out of the countersunk hole 78.

Referring again to FIGURES 1 and 3, each of the floor planks 42 has a plurality of ball valves 64 installed in the top surface thereof in a predetermined pattern so that at various different positions along the length of any given plank the ball valves will cooperate with a different one of the five channels 50 in that plank. Thus, the trailer floor 30 comprises ten segments, five segments 1R, 2R, etc. on the right side of the floor, and five segments 1L, 2L, etc. on the left side of the floor. In accordance with the present invention, and taking the plank member 42 which lies adjacent the right hand side plate 38 by way of example, the ball valves 64 which are installed in the portion of the plank disposed within the floor segment 1R are positioned so as to communicate with the longitudinal air duct 50A within that plank. Furthermore, the ball valves 64 disposed within the floor segment 2R communicate with the air duct 50B, the valves in segment 3R communicate with air duct 50C, the valves within segment 4R communicate with air duct 50D, and the valves within segment 5R communicate with air duct 50E. Thus, the plank 42 adjacent the side plate 38 is provided in effect with five sets of valves 64, one set for each of the desired five longitudinal floor segments. Each set of valves 64 comprises a plurality of valves aligned in a row, and each row is laterally offset from the other four rows because each row of valves communicates with a different one of the five channels in the floor plank 42.

It will now be understood that if air under pressure is conducted to the channel 50A in the floor plank 42 adjacent the right hand side plate 38, only that portion of the plank within the front floor segment 1R will in effect be energized, since the portions of the channel 50A outside of that segment have no ball valves which communicate therewith. Similarly, if air under pressure is conducted to the channel 50B, only the front middle section 2R of the plank will be energized, and in like manner air in the channel 50C will energize the middle section 3R, air in the channel 50D will energize the rear middle section 4R, and air in the channel 50E will energize the rear section 5R.

Each of the twelve planks 42 shown in FIGURE 1 are substantially identical, although as will be described hereinafter the six planks on the right side of the floor are supplied with air from a different set of manifolds from the planks on the left side so as to permit each longitudinal floor segment such as the front segment to be divided into two lateral segments, for example, 1R and 1L. Thus, in order to energize the entire front right floor segment 1R, it is necessary to supply air to the longitudinal air duct 50A of each of the six planks 42 on the right side of the trailer floor. In a similar fashion, in order to energize the entire floor segment 2R, it is necessary to supply air to the longitudinal air duct 50B of each of the six planks 42 on the right side of the trailer floor, and in a like manner any one (or more) of the ten floor segments may be energized by supplying air to the corresponding air ducts 50. In order to energize any given floor segment, air is supplied to one corresponding channel 50 in each of the six planks on the selected side of the floor.

FIGURE 6 shows an air source and a manifold system for supplying air under pressure to the channels 50 in the several floor planks 42 of the trailer floor. Thus, there is shown an air source comprising an engine powered blower unit 84 which supplies air to two sets of manifolds 86 and 88 which in turn supply air to the floor ducts 50. There are provided five manifolds 86A, 86B, 86C, 86D and 86E which supply air to the floor planks 42 disposed on the right side of the trailer floor 30, and there are also provided five manifolds 88A, 88B, 88C, 88D and 88E which supply air to the floor planks 42 disposed on the left side of the floor.

The five floor manifolds 86 are adapted to lie immediately under the six planks 42 which comprise the right hand side of the trailer floor 30, the manifolds being arranged parallel to one another and transversely of the floor planks. Furthermore, the manifolds 86 are longitudinally spaced, and are offset a small amount laterally from one another. Each one of the floor manifolds 86 and 88 is provided with six openings in its top surface, which openings are aligned with corresponding openings in the bottom surfaces 46 of the floor planks 42 so that air under pressure will be conducted upwardly from the manifolds into the channels 50 in the floor planks.

By way of example, the front right manifold 86A has six equally spaced openings 86' formed in its top surface, and the openings are spaced apart the same distance as the spacing of the several air ducts 50A in the six planks which form the right side of the trailer floor 30. Thus, each of the foregoing six planks is provided with an opening in the bottom wall 46 thereof, which opening communicates with the channel or duct 50A in the respective plank and is also aligned with a corresponding one of the openings 86' in the manifold 86A. Accordingly, the manifold 86A is adapted to supply air under pressure to the channels 50A in each of the six planks 42 on the right side of the trailer floor. FIGURE 8 shows the manner in which the manifolds 86 may be secured in position adjacent the underside of the planks 42 in transverse relation thereto. Thus, there is shown a supporting plate 90 which extends across the underside of the manifolds 86A and 86B and holds them firmly against the bottom wall 46 of the floor planks 42, and a plurality of bolt fasteners or the like 92 connect the plate 90 to the extruded floor sections.

As described earlier herein, the several channels 50A in the planks 42 on the right hand side of the trailer floor are adapted to supply air only to the front right floor section 1R, and it will thus be understood that the manifold 86A supplies air under pressure only to the floor segment 1R. In a similar fashion, each of the other four floor manifolds 86B, 86C, 86D and 86E corresponds respectively to the four right hand floor segments 2R, 3R, 4R and 5R. Thus, the front middle right hand manifold 86B is provided with six equally spaced openings 86' in its upper surface which are aligned with six corresponding openings formed in the bottom walls 46 of the six right hand planks 42, and the latter openings communicate with the longitudinal ducts 50B formed in each of the plank members. Accordingly, the manifold 86B is adapted to supply air to the 50B channel in each of the six right hand planks, and since as previously described the six channels 50B can conduct air under pressure only to the front middle right hand floor section 2R, it will be understood that the manifold 86B is adapted to conduct air only to the floor segment 2R. In like manner, the openings 86' in the floor manifold 86C are aligned with openings in the floor bottom walls 46 which openings communicate with the ducts 50C, the openings 86' in the manifold 86D are aligned with openings in the floor bottom walls 46 which communicate with the ducts 50D, and the openings 86' in the floor manifold 86E are aligned with openings in the floor bottom walls 46 which communicate with the ducts 50E. Consequently, the manifold 86C conducts air only to the floor segment 3R, the manifold 86D conducts air only to the floor segment 4R, and the manifold 86E conducts air only to the floor segment 5R.

The left hand manifolds 88A, 88B, 88C, 88D, and 88E cooperated with the left hand plank members 42 in a manner substantially identical to that described above with respect to the right hand side of the trailer floor. Each of the manifolds 88 is provided with six equally spaced openings 88' which cooperate with corresponding aligned openings formed in the bottom walls 46 of the six left hand floor planks 42. In this manner, the manifold 88A conducts air only to the floor segment 1L, the manifold 88B conducts air only to the floor segment 2L, the manifold 88C conducts air only to the floor segment 3L, the manifold 88D conducts air only to the floor segment 4L, and the manifold 88E conducts air only to the floor segment 5L.

Referring to FIGURES 6 and 7, I will now describe the manner in which air is conducted from the blower 84 to a selected one or more of the ten floor manifolds 86 and 88. A main supply manifold comprises a pipe 94 which communicates with the blower 84 and extends upwardly somewhat where it connects with a generally horizontal pipe 95 which extends rearwardly beneath the left hand floor manifolds 88 to a location at the rear thereof where it connects with a horizontal pipe 96 which extends laterally toward the right side of the trailer and connects with a right hand valve chamber 98. The pipe 95 also connects with a horizontal pipe 99 which extends laterally toward the left side of the trailer and connects with a left hand valve chamber 100.

Adjacent the forward end of the supply pipe 95 there is provided a downwardly extending pipe extension 101 having mounted thereon a pressure relief valve 102 for regulating the system pressure, which in the embodiment described may be approximately 9 to 10 p.s.i.g. A main supply valve 104 is provided in the pipe section 94, and it will be understood that when the valve 104 is open, pressure regulated air will be supplied to both the right hand valve chamber 98 and the left hand valve chamber 100. A pipe section 106 connects with the lateral pipe section 96 and extends rearwardly therefrom, and at the end of the pipe 106 there is mounted a male adapter quick coupling 108 which permits connection of the main manifold system with an external air source when desired. Of course, if an external air source is utilized, the trailer mounted blower 84 can be cut off by closing the main supply valve 104.

I will now describe the means for controlling flow of air under pressure from the valve chambers 98 and 100 to selected ones of the floor manifolds 86 and 88. FIGURE 6 shows a plurality of low pressure air valves 110 and 112, one for each of the floor manifolds 86 and 88, for controlling the flow of air thereto. Thus, there are five left hand low pressure air valves 110A, 110B, 110C, 110D and 110E which cooperate respectively with the left hand floor manifolds 88A, 88B, 88C, 88D and 88E. In a similar fashion, five right hand low pressure air valves 112A, 112B, 112C, 112D and 112E are provided which cooperate respectively with the five right hand floor manifolds 86A, 86B, 86C, 86D and 86E.

FIGURE 9 and 10 show by way of example the manner in which the low pressure air valve 110A is associated with the left valve chamber 100 to control flow of air to the corresponding floor manifold 88A. The low pressure air valve 110A comprises an air cylinder 114A which acts upon a valve stem 116 carrying a rubber sealing disc 118 to push the latter away from a manifold plate 120 in order to permit air to flow from the valve chamber 100 into a housing member 122 and then upwardly into a duct 124 which is connected with the floor manifold 88A at the underside of the latter by means of a rubber hose connection 125A (see FIGURE 7). The manifold plate 120 is apertured to permit air to flow therethrough, but the sealing disc 118 is normally held against such plate to close the apertures and prevent the flow of air to the floor manifold 88A. In order to cause air to flow from the valve chamber 100 to the manifold 88A, air under pressure is conducted (in a manner to be described hereinafter) to the air cylinder 114A to actuate the latter and move the sealing disc 118 to an open position as shown in FIGURE 10.

Each of the ten low pressure air valves 110 and 112 is provided with an air cylinder which operates in the manner described above in connection with the air cylinder 114A, and each communicates with a corresponding one of the two valve chambers 98 or 100 and with a corresponding one of the ten floor manifolds 86 and 88 to control the flow of air from a valve chamber to its corresponding floor manifold. FIGURE 7 shows the several ruber hose connections 125B, 125C, 125D and 125E for connecting the housings of the air valves 110B, 110C, 110D and 110E to the undersides of the corresponding floor manifolds 88B, 88C, 88D and 88E.

FIGURE 6 shows the means for actuating the various low pressure air valves 110 and 112. A control valve supply line 126 is connected with the rear pipe section 106 of the main supply manifold so as to cause pressure regulated air to be supplied at five control valves 128A, 128B, 128C, 128D and 128E. The control valve 128A is connected to the air cylinder 114A of the low pressure air valve 110A by means of an air cylinder supply line 130A. It will thus be understood that when the control valve 128A is opened, the corresponding low pressure air valve 110A will be opened to permit air under pressure to flow from the valve chamber 100 to the floor manifold 88A, and then into the various air ducts 50A in the left hand floor planks 42 so as to energize the front left floor segment 1L as previously described.

In a manner similar to that described above, the control valve 128B is connected to the air valve 110B by an air cylinder supply line 130B, the control valve 128C is connected to the air valve 110C by an air cylinder supply line 130C, the control valve 128D is connected to the air valve 110D by an air cylinder supply line 130D, and the control valve 128E is connected to the air valve 110E by an air cylinder supply line 130E. Thus, the control valve 128A controls the supply of air to the floor segment 1L, the control valve 128B controls the supply of air to the floor segment 2L, the control valve 128C controls the supply of air to the floor segment 3L, the control valve 128D controls the supply of air to the floor segment 4L, and the control valve 128E controls the supply of air to the floor segment 5L. Five additional control valves and related supply lines (not shown) are associated with the right hand air valves 112A, 112B, 112C, 112D and 112E to control the flow of air to the floor segments 1R, 2R, 3R, 4R and 5R. The right hand control valves are not shown as they may be identical to the above-described left hand control valves. In the embodiment being described, the left hand control valves 128 may be mounted at a control panel on the inside left side wall of the trailer at the rear, and the right hand control valves may be similarly mounted at a control panel on the inside right side wall at the rear of the trailer.

It will now be seen from the foregoing description of a preferred embodiment that I have achieved the stated objects of the invention and provided an improved air-in-floor system offering numerous significant advantages. Thus, the trailer floor area 30 can be divided into any desired number of segments depending upon the number of longitudinal air ducts or channels provided in the floor planks, and such segments may or may not be of equal size as desired. Any one floor segment or any desired combination of floor segments can be energized for use without energizing the remaining floor segments, and by using such a system of selective energization it is possible to equip the system with an air source of substantially less capacity than would otherwise be required. In other words, if a trailer is fully loaded, all of the ball valves 64 will be actuated, and to provide an air source such as a blower having sufficient capacity to supply air under pressure to the entire floor is not always practical, particularly where it is desired to provide a blower unit which can be mounted on and carried with the trailer.

Another advantage of the present air-in-floor system is the safety feature provided by selective energization. Where a trailer is fully loaded and the entire floor is energized, there is a risk that if the trailer floor is inclined slightly the entire load may slide out. On the other hand, by energizing only a small section of the trailer floor at a time, it is possible to exercise greater control over movement of the load. It should also be noted that with the present system the hollow extruded aluminum floor planks 42 or other suitable floor planks with ducts therein can be installed full length without necessity for cutting and blocking off the ends of the planks at each individual segment, since the flow of air to the various segments is controlled by the location of the ball valves 64 and the manner in which they cooperate with respective ones of the floor air ducts 50.

Reference is now made to FIGURES 11–14 which show an air-in-floor dock board for use with the air-in-floor trailer described hereinabove. FIGURE 11 shows a dock board section 132 comprised of a plurality of hollow extruded aluminum floor planks 134. In the embodiment described, there are ten floor plank members 134. As shown in FIGURE 12, the planks may be substantially identical in their configuration to the floor planks 42 of the trailer floor described earlier herein, and they may be arranged side-by-side and interlocked with one another as also described hereinabove. Thus, each plank 134 is provided with five longitudinal air ducts 136 separated by divider walls 138, and also a top wall 140 and a bottom wall 142. In this embodiment a plurality of ball valve assemblies 144 are installed in the top wall 140 of the floor along the length of the plank members 134, the valves being adapted to communicate only with a single longitudinal channel 136A in each of the planks. Thus, in the particular dock board shown, the floor is not adapted to be divided into segments, but is energized throughout its entirety, although it may be divided if so desired.

The extruded floor planks 134 are attached to a frame comprised of a pair of side tubes 146 and 148 between which a plurality of structural cross members such as shown at 147 are attached. The side tube 148 is provided with an air inlet 153 and is adapted to serve as an inlet manifold for the air supply as well as a structural member. A pair of cross manifolds 150 and 152 are mounted underneath the floor planks 134 between the side tubes 146 and 148, and are provided with openings 154 in their upper surfaces (see FIGURE 12) which are aligned with openings 155 formed in the bottom wall 142 of the floor planks for communication with the channel 136A in each plank. It will thus be understood that when an air source is connected to the inlet 153 in the manifold side tube 148, air under pressure will flow through the side tube 148, into the two cross manifold members 150 and 152, and then upwardly through the openings 154 in the cross manifolds and the aligned openings 155 in the bottoms of the floor planks so as to be conducted into the longitudinal floor channel 136A in each of the planks, which channels as mentioned above cooperate with the plurality of ball valves 144.

FIGURE 13 shows the dock board 132 in side elevation and illustrates the manner in which the dock board is adapted to be supported on the rear edge of a trailer during loading and unloading of the latter. There is shown a portion of the trailer floor 30, and a trailer rear end plate 158 having an opening 159 beneath which a reinforcing washer 160 is provided. A pair of inverted U-shaped lift handles 162 are provided at the forward end of the dock board 132 at opposite sides thereof immediately outwardly of the side tubes 146 and 148. For example, a lift handle 162 is mounted on a plate 163 which is welded to the outside of the side tube 148. As shown in FIGURE 13, each lift handle has a forward leg portion 164 of extended length which is adapted to project downwardly through the opening 159 in the trailer rear end plate 158 so as to serve as a locating pin and thereby hook the end of the dock board to the rear end of the trailer floor.

The rear end of the dock board 132 is provided at each side with a caster 166. One caster 166 is mounted at the rear end of each of the side tubes 146 and 148, whereby the forward end of the dock board will rest on the rear edge of the trailer and be held in place by the locating pins 164, while the rear end on the dock board will be supported on the casters 166. Each caster 166 is carried on a frame 168 by means of a pin 169, and the frame is pivoted on a pin 170 to permit adjustment of the height of the caster. A portion of the frame 168 is formed with a plurality of holes 172, and a locking pin 174 is adapted to be inserted through one of the holes in the frame and through a suitable opening in the supporting structure so as to lock the caster 166 in a desired position.

It will now be understood that as the trailer is loaded or unloaded, and the height of the trailer floor 30 thus changes, the dock board 132 will pivot on the caster 166 so as to permit the dock board floor to remain even with the floor surface 30 of the trailer at the transition point where the dock board rests on the rear edge of the trailer floor.

While I have illustrated my invention in a preferred form, I do not intend to be limited to that form, except insofar as the appended claims are so limited, since modifications coming within the scope of my invention will be readily suggested to others with my disclosure before them.

I claim:

1. In an air-in-floor system of the type where air under pressure is supplied to air valves mounted in a floor for providing a thin film of air between the floor and a load, the improvement comprising, in combination, a floor, a plurality of air valves mounted in said floor and adapted when opened to direct air upwardly therefrom, said valves being arranged in groups which are mounted at spaced intervals along the length of said floor so as to conduct air to various longitudinal portions of the floor, a plurality of substantially parallel longitudinal air ducts in said floor for conducting air under pressure to said valves, said ducts being arranged to communicate with predetermined respective groups of said valves so as to energize predetermined respective longitudinal portions of said floor, and means for conducting air under pressure to selected ones of said ducts to energize at least one selected longitudinal portion of said floor, said last-mentioned means including a plurality of manifold members which are disposed beneath said longitudinal air ducts and extend transversely thereto for supplying air to selected ones of said longitudinal ducts in order to energize selected longitudinal portions of said floor.

2. In an air-in-floor system of the type where air under pressure is supplied to air valves mounted in a floor for providing a thin film of air between the floor and a load, the improvement comprising, in combination, a floor, a plurality of air valves mounted in said floor and adapted when opened to direct air upwardly therefrom, said valves being arranged in groups which are mounted at spaced intervals along the length of said floor to conduct air to various longitudinal portions of the floor and said groups being offset laterally from one another, a plurality of substatially parallel longitudinal air ducts in said floor for conducting air under pressure to said valves, said ducts being spaced laterally approximately the same as the lateral spacing of said offset groups of valves whereby said ducts communicate with predetermined respective groups of valves to energize predetermined respective longitudinal portions of said floor, and means for conducting air under pressure to selected ones of said ducts to energize at least one selected longitudinal portion of said floor.

3. In an air-in-floor system of the type where air under pressure is supplied to air valves mounted in a floor for providing a thin film of air between the floor and a load, the improvement comprising, in combination, a floor, a plurality of air valves mounted in said floor and adapted when opened to direct air upwardly therefrom, said valves being arranged in groups which are mounted at spaced intervals along the length of said floor to conduct air to various longitudinal portions of the floor and said groups being offset laterally from one another, a plurality of substantially parallel longitudinal air ducts which extend substantially the full length of said floor for conducting air under pressure to said valves, said ducts being spaced laterally approximately the same as the lateral spacing of said offset groups of valves whereby said ducts communicate with predetermined respective groups of valves to energize predetermined respective longitudinal portions of said floor, and means for conducting air under pressure to selected ones of said ducts to energize at least one selected longitudinal portion of said floor.

4. In an air-in-floor system of the type where air under pressure is supplied to air valves mounted in a floor for providing a thin film of air between the floor and a load, the improvement comprising, in combination, a floor, a plurality of air valves mounted in said floor and adapted when opened to direct air upwardly therefrom, said valves being arranged in groups with each group comprised of a longitudinal row of substantially aligned valves which extends for a portion of the length of said floor, said rows being offset laterally from one another and being disposed at various respective longitudinal portions of the floor so as to conduct air thereto, a plurality of substantially parallel longitudinal air ducts in said floor for conducting air under pressure to said valves, said ducts being spaced laterally approximately the same as the lateral spacing of said offset rows of valves whereby said ducts communicate with predetermined respective rows of valves to energize predetermined respective longitudinal portions of said floor, and means for conducting air under pressure to selected ones of said ducts to energize at least one selected longitudinal portion of said floor.

5. In an air-in-floor system of the type where air under pressure is supplied to air valves mounted in a floor for providing a thin film of air between the floor and a load, the improvement comprising, in combination, a floor, a plurality of air valves mounted in said floor and adapted when opened to direct air upwardly therefrom, said valves being arranged in groups with each group comprised of a longitudinal row of substantially aligned valves which extends for a portion of the length of said floor, said rows being offset laterally from one another and being disposed at various respective longitudinal portions of the floor so as to conduct air thereto, a plurality of substantially parallel longitudinal air ducts which extend substantially the full length of said floor for conducting air under pressure to said valves, said ducts being spaced laterally approximately the same as the lateral spacing of said offset rows of valves whereby said ducts communicate with predetermined respective rows of valves to energize predetermined respective longitudinal portions of said floor, and means for conducting air under pressure to selected ones of said ducts to energize at least one selected longitudinal portion of said floor.

6. In an air-in-floor system of the type where air under pressure is supplied to air valves mounted in a floor for providing a thin film of air between the floor and a load, the improvement comprising, in combination, a floor comprised of a plurality of longitudinal hollow floor planks arranged in side-by-side relation, a plurality of air valves mounted in each of said floor planks and adapted when opened to direct air upwardly therefrom, the valves in each of said planks being arranged in groups which are mounted at spaced intervals along the length of the plank so as to conduct air to various longitudinal portions of the plank, and a plurality of longitudinal air ducts formed in the hollow interior of each of said planks for conducting air under pressure of said valves, the ducts in each plank being arranged to communicate with predetermined respective groups of valves in that plank so as to energize predetermined respective longitudinal portions of the plank.

7. In an air-in-floor system of the type where air under pressure is supplied to air valves mounted in a floor for providing a thin film of air between the floor and a load the improvement comprising, in combination, a floor comprised of a plurality of hollow floor planks arranged in side-by-side relation, a plurality of air valves mounted in each of said floor planks and adapted when opened to direct air upwardly therefrom, the valves in each of said planks being arranged in groups which are mounted at spaced intervals along the length of the plank so as to conduct air to various longitudinal portions of the plank, a plurality of longitudinal air ducts formed in the hollow interior of each of said planks for conducting air under pressure to said valves, the ducts in each plank being arranged to communicate with predetermined respective groups of valves in that plank so as to energize predetermined respective longitudinal portions of the plank, and means for conducting air under pressure to selected ones of the ducts in said planks to energize at least one selected longitudinal portion of said floor.

8. In an air-in-floor system of the type where air under pressure is supplied to air valves mounted in a floor for providing a thin film of air between the floor and a load, the improvement comprising, in combination, a floor comprised of a plurality of hollow floor planks arranged in side-by-side relation, a plurality of air valves mounted in each of said floor planks and adapted when opened to direct air upwardly therefrom, the valves in each of said planks being arranged in groups which are mounted at spaced intervals along the length of the plank to conduct air to various longitudinal portions of the plank and said groups being offset laterally from one another, a plurality of substantially parallel longitudinal air ducts formed in the hollow interior of each of said planks for conducting air under pressure to said valves, said ducts being spaced laterally approximately the same as the lateral spacing of said offset groups of valves whereby the ducts in each plank will communicate with predetermined respective groups of valves in that plank so as to energize predetermined respective longitudinal portions of the plank, and means for conducting air under pressure to selected ones of the ducts in said planks to energize at least one selected longitudinal portion of said floor.

9. In an air-in-floor system of the type where air under pressure is supplied to air valves mounted in a floor for providing a thin film of air between the floor and a load, the improvement comprising, in combination, a floor comprised of a plurality of hollow floor planks arranged in side-by-side relation, a plurality of air valves mounted in each of said floor planks and adapted when opened to direct air upwardly therefrom, the valves in each of said planks being arranged in groups which are mounted at spaced intervals along the length of the plank to conduct air to various longitudinal portions of the plank and said groups being offset laterally from one another, a plurality of substantially parallel longitudinal air ducts formed in the hollow interior of each of said planks which ducts extend substantially the full length of said planks for conducting air under pressure to said valves, said ducts being spaced laterally approximately the same as the lateral spacing of said offset groups of valves whereby the ducts in each plank communicate with predetermined respective groups of valves in that plank so as to energize predetermined respective longitudinal portions of the plank, and means for conducting air under pressure to selected ones of the ducts in said planks to energize at least one selected longitudinal portion of said floor.

10. In an air-in-floor system of the type where air under pressure is supplied to air valves mounted in a floor for providing a thin film of air between the floor and a load, the improvement comprising, in combination, a floor comprised of a plurality of hollow floor planks arranged in side-by-side relation, a plurality of air valves mounted in each of said floor planks and adapted when opened to direct air upwardly therefrom, the valves in each of said planks being arranged in groups with each group comprised of a longitudinal row of substantially aligned valves which extends for a portion of the length of the plank, said rows being offset laterally from one another and being disposed at various respective longitudinal portions of the plank so as to conduct air thereto, a plurality of substantially parallel longitudinal air ducts formed in the hollow interior of each of said planks for conducting air under pressure to said valves, said ducts being spaced laterally approximately the same as the lateral spacing of said offset rows of valves whereby the ducts in each plank will communicate with predetermined respective rows of valves so as to energize predetermined respective longitudinal portions of the plank, and means for conducting air under pressure to selected ones of the ducts in said planks to energize at least one selected longitudinal portion of said floor.

11. In an air-in-floor system of the type where air under pressure is supplied to air valves mounted in a floor for providing a thin film of air between the floor and a load, the improvement comprising, in combination, a floor comprised of a plurality of hollow floor planks arranged in side-by-side relation, a plurality of air valves mounted in each of said floor planks and adapted when opened to direct air upwardly therefrom, the valves in each of said planks being arranged in groups with each group comprised of a longitudinal row of substantially aligned valves which extends for a portion of the length of the plank, said rows being offset laterally from one another and being disposed at various respective longitudinal portions of the plank so as to conduct air thereto, a plurality of substantially parallel longitudinal air ducts formed in the hollow interior of each of said planks which ducts extend substantially the full length of said planks for conducting air under pressure to said valves, said ducts being spaced laterally approximately the same as the lateral spacing of said offset rows of valves whereby the ducts in each plank will communicate with predetermined respective rows of valves so as to energize predetermined respective longitudinal portions of the plank, and means for conducting air under pressure to selected ones of the ducts in said planks to energize at least one selected longitudinal portion of said floor.

12. In an air-in-floor system of the type where air under pressure is supplied to air valves mounted in a floor for providing a thin film of air between the floor and a load, the improvement comprising, in combination, a floor comprised of a plurality of hollow extruded aluminum floor planks arranged in side-by-side relation, a plurality of air valves mounted in each of said floor planks and adapted when opened to direct air upwardly therefrom, the valves in each of said planks being arranged in groups which are mounted at spaced intervals along the length of the plank to conduct air to various longitudinal portions of the plank and said groups being offset laterally from one another, a plurality of substantially parallel longitudinal air ducts formed in side-by-side relation in the hollow interior of each of said extruded aluminum planks which ducts extend substantially the full length of said planks for conducting air under pressure to said valves, said ducts being spaced laterally approximately the same as the lateral spacing of said offset groups of valves whereby the ducts in each plank communicate with predetermined respective groups of valves in that plank so as to energize predetermined respective longitudinal portions of the plank, and means for conducting air under pressure to selected ones of the ducts in said planks to energize at least one selected longitudinal portion of said floor.

13. In an air-in-floor system of the type where air under pressure is supplied to air valves mounted in a floor for providing a thin film of air between the floor and a load, the improvement comprising, in combination, a floor comprised of a plurality of hollow extruded aluminum floor planks arranged in side-by-side relation, a plurality of air valves mounted in each of said floor planks and adapted when opened to direct air upwardly therefrom, the valves in each of said planks being arranged in groups with each group comprised of a longitudinal row of substantially aligned valves which extends for a portion of the length of the plank, said rows being offset laterally from one another and being disposed at various respective longitudinal portions of the plank so as to conduct air thereto, a plurality of substantially parallel longitudinal air ducts formed in side-by-side relation in the hollow interior of each of said extruded aluminum planks which ducts extend substantially the full length of said planks for conducting air under pressure to said valves, said ducts being spaced laterally approximately the same as the lateral spacing of said offset rows of valves whereby the ducts in each plank will communicate with predetermined respective rows of valves so as to energize predetermined respective longitudinal portions of the plank, and means for conducting air under pressure to selected ones of the ducts in said planks to energize at least one selected longitudinal portion of said floor.

14. In an air-in-floor system of the type where air under pressure is supplied to air valves mounted in a floor for providing a thin film of air between the floor and a load, the improvement comprising, in combination, a floor comprised of a plurality of hollow floor planks arranged in side-by-side relation, a plurality of air valves mounted in each of said floor planks and adapted when opened to direct air upwardly therefrom, the valves in each of said planks being arranged in groups which are mounted at spaced intervals along the length of the plank so that each group supplies air to a different longitudinal portion of the corresponding plank, a plurality of longitudinal air ducts formed in the hollow interior of each of said planks for conducting air under pressure to said valves, each duct being arranged to communicate with a corresponding group of valves in its respective plank whereby each duct will energize a predetermined longitudinal portion of the associated plank, and a plurality of manifold members, each manifold member being arranged to conduct air under pressure to a respective plurality of ducts, one in each of said planks, the ducts supplied by a given manifold member having in common that they each energize the same longitudinal portion of their respective planks whereby each manifold member will energize a predetermined longitudinal portion of said floor.

15. In an air-in-floor system of the type where air under pressure is supplied to air valves mounted in a floor for providing a thin film of air between the floor and a load, the improvement comprising, in combination, a floor comprised a plurality of hollow floor planks arranged in side-by-side relation, a plurality of air valves mounted in each of said floor planks and adapted when opened to direct air upwardly therefrom, the valves in each of said planks being arranged in groups which are mounted at spaced intervals along the length of the plank so that each group supplies air to a different longitudinal portion of the corresponding plank and said groups being offset laterally from one another, a plurality of substantially parallel longitudinal air ducts formed in the hollow interior of each of said planks for conducting air under pressure to said valves, said ducts being spaced laterally approximately the same as the lateral spacing of said offset groups of valves so that each duct will communicate with a corresponding group of valves in its respective plank whereby each duct will energize a predetermined longitudinal portion of the associated plank, and a plurality of manifold members, each manifold member being arranged to conduct air under pressure to a respective plurality of ducts, one in each of said planks, the ducts supplied by a given manifold member having in common that they each energize the same longitudinal portion of their respective planks whereby each manifold member will energize a predetermined longitudinal portion of said floor.

16. In an air-in-floor system of the type where air under pressure is supplied to air valves mounted in a floor for providing a thin film of air between the floor and a load, the improvement comprising, in combination, a floor comprised of a plurality of hollow floor planks arranged in side-by-side relation, a plurality of air valves mounted in each of said floor planks and adapted when opened to direct air upwardly therefrom, the valves in each of said planks being arranged in groups with each group comprised of a longitudinal row of substantially aligned valves which extends for a portion of the length of the plank, said rows being offset laterally from one another and being disposed at various respective longitudinal portions of the plank so that each row supplies air to a different longitudinal portion of the corresponding plank, a plurality of substantially parallel longitudinal air ducts formed in the hollow interior of each of said planks which ducts extend substantially the full length of said planks for conducting air under pressure to said valves, said ducts being spaced laterally approximately the same as the lateral spacing of said offset rows of valves so that each duct will communicate with a corresponding row of valves in its respective plank whereby each duct will energize a predetermined longitudinal portion of the associated plank, and a plurality of manifold members, each manifold member being arranged to conduct air under pressure to a respective plurality of ducts, one in each of said planks, the ducts supplied by a given manifold member having in common that they each energize the same longitudinal portion of their respective planks whereby each manifold member will energize a predetermined longitudinal portion of said floor.

17. In an air-in-floor system of the type where air under pressure is supplied to air valves mounted in a floor for providing a thin film of air between the floor and a load, the improvement comprising, in combination, a floor comprised of a plurality of hollow extruded aluminum floor planks arranged in side-by-side relation, a plurality of air valves mounted in each of said floor planks and adapted when opened to direct air upwardly therefrom, the valves in each of said planks being arranged in groups with each group comprised of a longitudinal row of substantially aligned valves which extends for a portion of the length of the plank, said rows being offset laterally from one another and being disposed at various respective longitudinal portions of the plank so that each row supplies air to a different longitudinal portion of the corresponding plank, a plurality of substantially parallel longitudinal air ducts formed in the hollow interior of each of said extruded aluminum planks which ducts extend substantially the full length of said planks for conducting air under pressure to said valves, said ducts being spaced laterally approximately the same as the lateral spacing of said offset rows of valves so that each duct will communicate with a corresponding row of valves in its respective plank whereby each duct will energize a predetermined longitudinal portion of the associated plank, and a plurality of manifold members, each manifold member being arranged to conduct air under pressure to a respective plurality of ducts, one in each of said extruded planks, the ducts supplied by a given manifold member having in common that they each energize the same longitudinal portion of their respective planks whereby each manifold member will energize a predetermined longitudinal portion of said floor.

18. The invention of claim 17 wherein each of said manifold members comprises a floor manifold which is disposed immediately beneath the plurality of floor planks in transverse relation thereto and which is provided with air outlet openings in its top surface which openings are aligned with corresponding air inlet openings in the underside of said planks.

19. The invention of claim 18 comprising an air source, a plurality of air valves, one associated with each of said manifold members for controlling flow of air thereto from said air source, means for conducting air to selected ones of said air valves to open the same, and a plurality of control valves, one for controlling the flow of air to each of said air valves, whereby upon opening of a selected one of said control valves air will be conducted to a corresponding one of said air valves to open the same thus permitting air to flow from said air source to the corresponding one of said manifold members.

20. For use with a tailer provided with an air-in-floor system of the type where air under pressure is supplied to air valves mounted in the trailer floor for providing a thin film of air between the floor and a load, the improvement comprising, in combination, a dock board comprised of a plurality of hollow floor planks arranged in side-by-side relation and having longitudinal air ducts therein for supplying air under pressure to air valves mounted in the top of the dock board for directing air upwardly therefrom, at least one hollow side member which extends longitudinally along the side of said dock board for supplying air under pressure thereto, a cross manifold member disposed beneath said planks in transverse relation thereto, said cross manifold being connected to said side member and having openings in its upper surface which are aligned with corresponding openings in the underside of said planks, means for securing one end of said dock board to the rear end of a trailer floor, and caster means for supporting the opposite end of said dock board.

References Cited by the Examiner
UNITED STATES PATENTS

| | | |
|---|---|---|
| 2,176,307 | 10/1939 | Lamb. |
| 2,678,237 | 5/1954 | Allander. |
| 2,940,617 | 6/1960 | Reed. |
| 3,052,339 | 9/1962 | Carter. |
| 3,108,698 | 10/1963 | Petersen. |

HUGO O. SCHULZ, *Primary Examiner.*

MARVIN A. CHAMPION, *Examiner.*